UNITED STATES PATENT OFFICE.

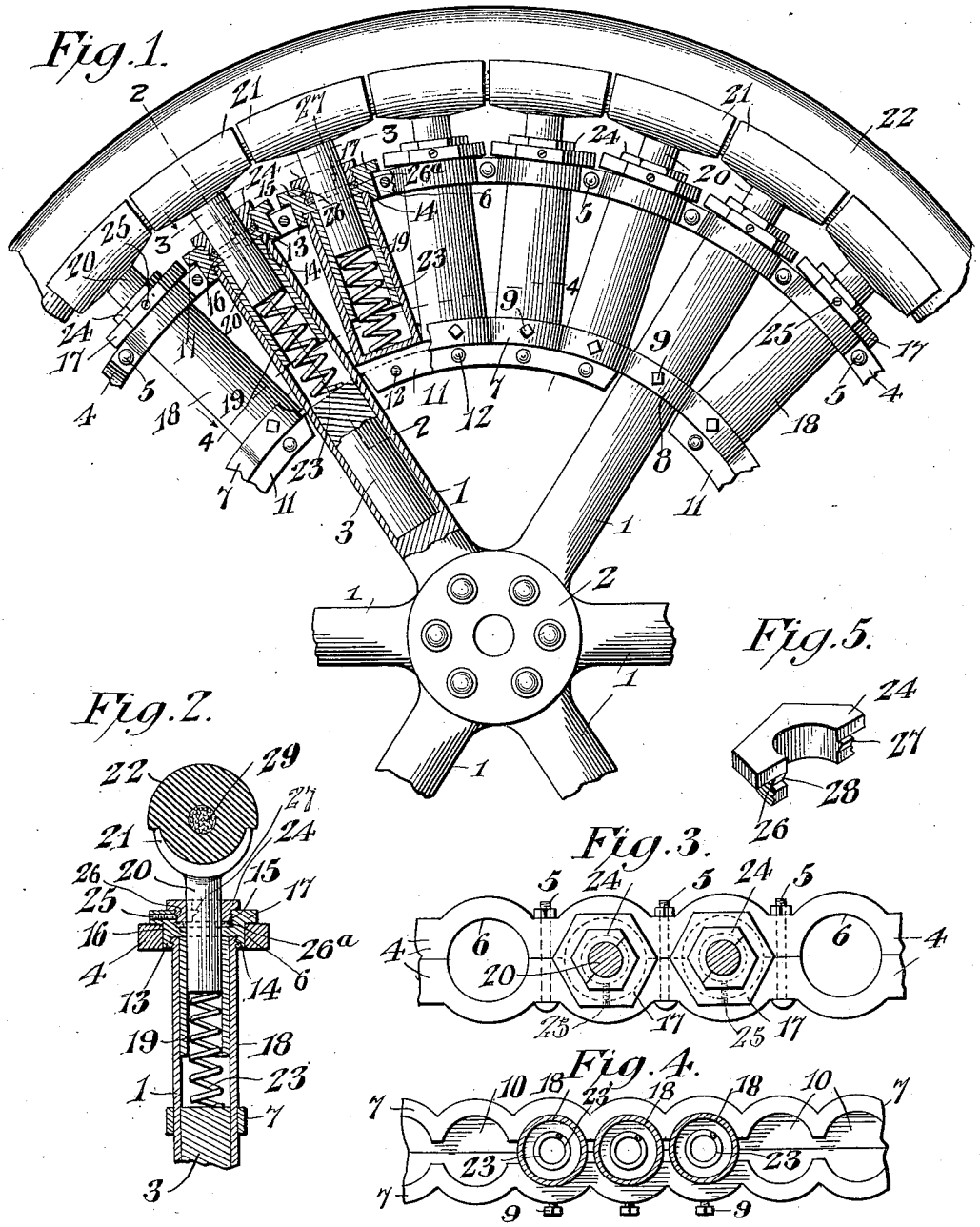

JOHN J. FAHRNEY, OF TIMBERVILLE, VIRGINIA, ASSIGNOR OF ONE-THIRD TO JOHN P. BURKE, OF HARRISONBURG, VIRGINIA, AND ONE-SIXTH TO JOHN T. HELBERT AND ONE-SIXTH TO FRANK H. DRIVER, BOTH OF TIMBERVILLE, VIRGINIA.

VEHICLE-WHEEL.

1,087,225. Specification of Letters Patent. Patented Feb. 17, 1914.

Application filed December 20, 1912. Serial No. 737,906.

*To all whom it may concern:*

Be it known that I, JOHN J. FAHRNEY, a citizen of the United States, residing at Timberville, in the county of Rockingham and State of Virginia, have invented a new and useful Vehicle-Wheel, of which the following is a specification.

This invention has reference to improvements in vehicle wheels and is designed to provide a wheel having a tread portion so connected to the main body of the wheel that it will elastically yield to the weight of the vehicle to a limited extent to produce effects similar to those of a pneumatic tire.

In accordance with the present invention the wheel is provided with a hub and spokes and a rim member firmly united to the outer ends of the spokes, while interior to and concentric with the rim member is another similar member also firmly united to the spokes and carrying sockets intermediate of and coacting with the spokes, the latter being made hollow to receive springs and plungers, which plungers project beyond the rim while the intermediate sockets also carry springs and plungers and all the plungers terminate in heads shaped to receive the elastic tread of any suitable form.

The invention is designed particularly to provide a simple form of spring or elastic wheel not liable to get out of order and easily repaired when injured or worn, and, moreover, one which will be light but still strong enough to withstand all the strains to which the vehicle wheel such as used upon an automobile or auto-truck may be called upon to sustain.

The invention will be best understood from a consideration of the following detailed description taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is an elevation with parts in section and broken away of a portion of a vehicle wheel constructed in accordance with the present invention. Fig. 2 is a section on the line 2—2 of Fig. 1. Fig. 3 is a section on the line 3—3 of Fig. 1. Fig. 4 is a section on the line 4—4 of Fig. 1. Fig. 5 is a perspective view of a split bushing employed in connection with the invention.

Referring to the drawings there are shown spokes 1 radiating from a hub 2, which latter may be constructed in the manner set forth in my application No. 652,873, filed October 4, 1911, for vehicle wheel, in which application certain features of the present invention are also shown.

The spokes 1 are hollow throughout the greater portion of their length and for purposes of lightness this hollow part may reach close to the hub 2, in which case filling blocks 3 are employed.

At the outer ends of the spokes there is a ring 4 which may be made up of two like parts secured together by bolts 5 or in any other suitable manner, and at suitable intervals the ring is laterally expanded to form passages 6. Of course, the ring might be wide enough to admit of the formation of the passages 6 without lateral expansion, but this would unnecessarily add to the weight of the ring, and it is, therefore, preferred to form the ring substantially as shown, particularly in Fig. 3, and the bolts 5 may be passed through the narrower portions of the ring. Interior to the ring 4 the spokes carry another ring 7 which may also be divided like the ring 4, and has portions 8 arranged to embrace the spokes and may be connected thereto by set screws 9 or otherwise. Between the spokes the ring 7 is formed with sockets or recesses 10 and on the sides of these sockets or recesses toward the hub of the wheel the ring is formed with flanges 11 which may be brought together and secured by bolts or rings 12. The sockets 10 and the passages 6 of the ring 4 are arranged in radial alinement for a purpose which will presently appear. Moreover, the ring 7 is spaced an appropriate distance toward the hub from the ring 4 to accommodate certain structures to be described.

Each passage 6 has seated therein a collar 13 which may be held in the appropriate passage 6 by the clamping action of the bolts 5. This collar has at opposite ends internal screw threads 14, 15, respectively, and between these screw threads the collar is formed with an inwardly directed web or flange 16 provided with an opening. At that end of the collar provided with the threads 15 there is an exterior outwardly directed flange 17 which may be of polygonal periphery, usually hexagonal, for the application of a suitable tool, such as a wrench. The outer end of each spoke 1 is threaded to engage the screw threads 14 of the corresponding collar 13, the outer end of the spoke abutting against the web 16. Seated in each recess 10 is one end of a sleeve 18, such end being closed, and the other end of the sleeve is extended to and enters a respective collar 16, the sleeve being threaded similarly to the outer threaded end of the spoke 1 so as to engage the screw threads 14 of the appropriate collar. In each spoke 1 there is lodged a tube 19 and the like tube 19 is lodged in each sleeve 18. Entering one end of each tube 19 is a stem 20 of a length to project into the tube for a distance to form a firm union therewith when brazed or otherwise united to the tube, while the other end of the stem is of a length to project through the central passage in the web 16 and beyond the outer end of the collar 13 for an appropriate distance, terminating in a channel head 21 preferably of curved cross section similar to the curvature of wheel rims of familiar construction, and each head 21 is extended circumferentially into close relation to the next adjacent head, so that the heads together form a rim or channel about the wheel to receive a tire 22 which may also be of familiar construction and of any desired type.

Within each spoke 1 between the inner end of the stem 20 and the filler block 3 and within each sleeve 18 between the inner end of the stem 20 and the closed inner end of the sleeve there is lodged a spring 23 in part encircled by that portion of the tube 19 unoccupied by the stem 20, so that the tube in part houses and protects the spring.

When the parts are assembled and the tire 22 is placed in position in the rim made up of the associated channel heads 21 the springs 23 are under such initial compression as to support the weight of the vehicle for which the wheel is designed without the channel heads 21 then lowermost being forced into contact with those portions of the wheel carrying the heads and as the wheel revolves there is a sufficient amount of elasticity in the springs to allow easy riding. Should the tire strike an obstruction of any kind insufficient to affect the progress of the vehicle, those heads back of the portion of the tire striking such obstruction will yield and the wheel will ride over the obstruction without undue shock to the vehicle, and as soon as the obstruction is passed the heads and the tire sustained thereby will at once move to the first position under the expansive action of the springs 23.

In a vehicle wheel there are peripheral strains both circumferentially of the wheel and laterally thereof, and these strains in a wheel of the character shown in the present invention tend to cause wear on the parts traversed by the stems 20, so that in a comparatively short time the parts traversed by the stems 20 are no longer true but become elongated in the direction of the strain which, especially in the driving wheels, is more pronounced circumferentially. To overcome this tendency bushings 24 are provided, each bushing being made up of two like halves, one of which is separately illustrated in Fig. 5. The bushings are divided diametrically and have exterior screw threads 26 by means of which the bushings may be screwed into the collars 13 into engagement with the threads 15 and in surrounding relation to the stems 20 where projecting out from the webs 16. These bushings 24 are made of hardened metal, usually case-hardened metal, so as to effectively resist the wear of the stems 20, and the bushings 24 may be held against loosening by set screws 25 traversing the flanges 17 of the collars 13 and engaging appropriate portions of the bushings 24. The tubes 19 move with the stems 20 and consequently there is a liability of friction between the rubbing parts, wherefore a suitable lubricant is introduced into the spokes 1 and sleeves 18 and in order to prevent leakage of this lubricant, packing rings 26$^a$ are introduced between the bushings 24 and the webs 16. These packing rings have the further purpose of preventing the entrance of dust or dirt to the interior of the spokes or sleeves, as well as preventing the escape of lubricant, so that it is but on rare occasions that further lubrication is necessary. Should in the course of time a bushing 24 become worn, it may be turned, so that an unworn portion is presented to the stem 20. However, the bushings will sooner or later become too much worn to be further useful, in which case the screws 25 may be loosened and the bushings may be unscrewed from their seats in the collars 1 and because of the formation of the bushing, or may be readily separated and removed from the stem 20 without disturbing the latter, and a new bushing may be applied. To cause a proper matching of the threads 26 when the bushing is applied, the meeting edges of the two parts of the bushing are provided with teeth 27 and sockets 28 which serve to prevent movement of the two parts of the bushing in the direction of the longitudinal axis of the bushing, thereby holding the threads 26 in proper relation for screwing the bushing into the collar 13.

The bushings 24 are of very cheap construction and hence may be replaced when worn at but slight expense. The axial length of each bushing is such that it may be readily inserted or removed in the space between the head 21 and the collar 13, and, moreover, the bushing forms an abutment for the head 21 should the spring 23 compress sufficiently to permit such contact. The projection of the stem 20 under the action of the spring 23 is limited by the engagement of the tube 19 with the web 16.

The tire 22 should, of course, be sufficiently resistant to withstand the outward thrust of the springs 23 and for this purpose the tire may have a metallic reinforcement 29 embedded therein as is quite customary in vehicle tires of the solid or cushion type.

So far as the headed stems 20 are concerned both the spokes 1 and the sleeves 18 constitute receptacles therefor, and these receptacles, as well as the headed stems, are in radial relation to the axis of rotation of the wheel.

The split rings 4 and 7, the latter being socketed to receive the inner closed ends of the sleeves 18, are so made to facilitate the assembling of the wheel. While the split bushings 24 constituting wear bushings for the stems 20 are described as provided with a projection 27 and a recess 28 on each half, this arrangement may be taken as indicative of any interlocking positioning members for the split bushing, which latter not only serve as wear bushings but as packing glands for holding the packing 26ª in place. Moreover, the elongated tubular extensions 19 of the stems 20 form sliding guides for these stems within the receptacles.

The invention is not necessarily limited to the use of the tubes, but it is found advisable to employ them as housings for the corresponding ends of the spring.

What is claimed is—

1. In a vehicle wheel, a series of hollow spokes, a connecting ring carried by the spokes at their outer ends, another connecting ring carried by the spokes and separated from the first ring in a direction toward the axis of rotation of the wheel, radial sleeves carried by and extending between the rings intermediate of the spokes and secured at each end to a respective connecting ring, collars carried by the outer ring and receiving and secured to the outer ends of both the spokes and sleeves, headed stems entering the outer ends of the spokes and sleeves through the collars, springs housed in the spokes and sleeves and engaging the stems, and a tire carried by the heads of the stems.

2. In a vehicle wheel, a series of hollow spokes, a two part connecting ring for and carried by the outer ends of the spokes, another two-part ring carried by the spokes and spaced from the outer ring in a direction toward the axis of rotation of the wheel, the outer ring having passages therethrough between the spokes, and the inner ring having sockets between the spokes in radial alinement with the passages through the outer ring, radial sleeves of substantially the same diameter throughout having their inner ends seated in the sockets and their outer ends extending to the outer ring, collars carried by the outer ring and receiving the outer ends of the spokes and sleeves and to which said ends are secured, headed stems entering the outer ends of the spokes and sleeves through the collars, springs housed in the spokes and sleeves and engaging the stems, and a tire carried by the heads of the stems.

3. In a vehicle wheel, a series of hollow spokes, a two-part connecting ring for and carried by the outer ends of the spokes, another two-part ring carried by the spokes in spaced relation to the first-named ring toward the inner ends of the spokes, the outer ring having passages therethrough between the spokes and the inner ring having sockets between the spokes in radial alinement with the passages through the outer ring, radial sleeves having their inner ends seated in the sockets and their outer ends extending to the outer ring, collars carried by the outer ring and receiving the outer ends of the spokes and sleeves and to which said ends are secured, headed stems entering the outer ends of the spokes and sleeves through the collars, springs housed in the spokes and sleeves and engaging the stems, and a tire carried by the heads of the stems, each stem having a tubular extension fast thereto within the respective spoke or sleeve, one end of the tubular extension receiving the respective spring and the other end abutting the collar when the stem is at the limit of its projected position.

4. In a vehicle wheel, a series of hollow spokes, connecting rings for and carried by the spokes and spaced apart in the direction of the length of the spokes, radial sleeves carried by and extending between the rings intermediate of the spokes, collars carried by the outer ring and to which the outer ends of the spokes and sleeves are secured, said collars being each provided with a web forming an abutment for the respective ends of the spokes and sleeves, headed stems entering the outer ends of the spokes and sleeves through the webs of the collars and each carrying a tubular extension fast thereto within the respective spoke or sleeve, springs housed in the spokes and sleeves and entering the tubular extension to engage the stems, and a tire carried by the heads of the stems.

5. In a vehicle wheel, a series of hollow spokes, connecting rings for and carried by the spokes and spaced apart in the direction of the length of the spokes, radial sleeves carried by and extending between the rings intermediate of the spokes, collars carried by the outer ring and to which the outer ends of the spokes and sleeves are secured, said collars being each provided with a web forming an abutment for the respective ends of the spokes and sleeves, headed stems entering the outer ends of the spokes and sleeves through the webs of the collars and each carrying a tubular extension fast thereto within the respective spoke or sleeve, springs housed in the spokes and sleeves and entering the tubular extension to engage the stems, and a tire carried by the heads of the stems, each collar being provided at the outer end with a wear bushing of hard material engaging the stem where emerging from the collar.

6. In a vehicle wheel, a series of radial headed stems provided at their outer ends with means for supporting a vehicle tire, and a series of radial receptacles for the stems, the latter being provided with elongated tubular extensions forming sliding guides wholly housed within the receptacles and the latter being each provided with a bearing member for the stem between the extension and the tire supporting means, and springs within the receptacles each at one end entering a respective tubular extension and tending to project the headed stem.

In testimony, that I claim the foregoing as my own, I have hereto affixed my signature in the presence of two witnesses.

JOHN J. FAHRNEY.

Witnesses:
J. CARSON MILLER,
B. W. HITE.

---

Copies of this patent may be obtained for five cents each, by addressing the "Commissioner of Patents Washington, D. C."